3,497,071
FILTRATION APPARATUS AND HOLDER FOR FILTER
Salvatore C. Mineo, Fullerton, Calif., assignor to Hunt-Wesson Foods, Inc., Fullerton, Calif., a corporation of Delaware
Filed Jan. 15, 1968, Ser. No. 697,739
Int. Cl. B01d *23/00, 35/08*
U.S. Cl. 210—474
14 Claims

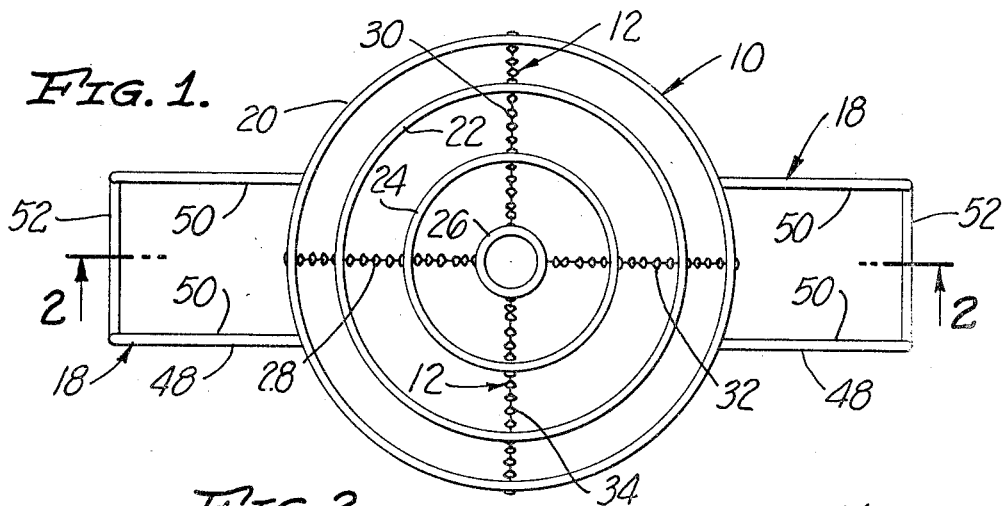
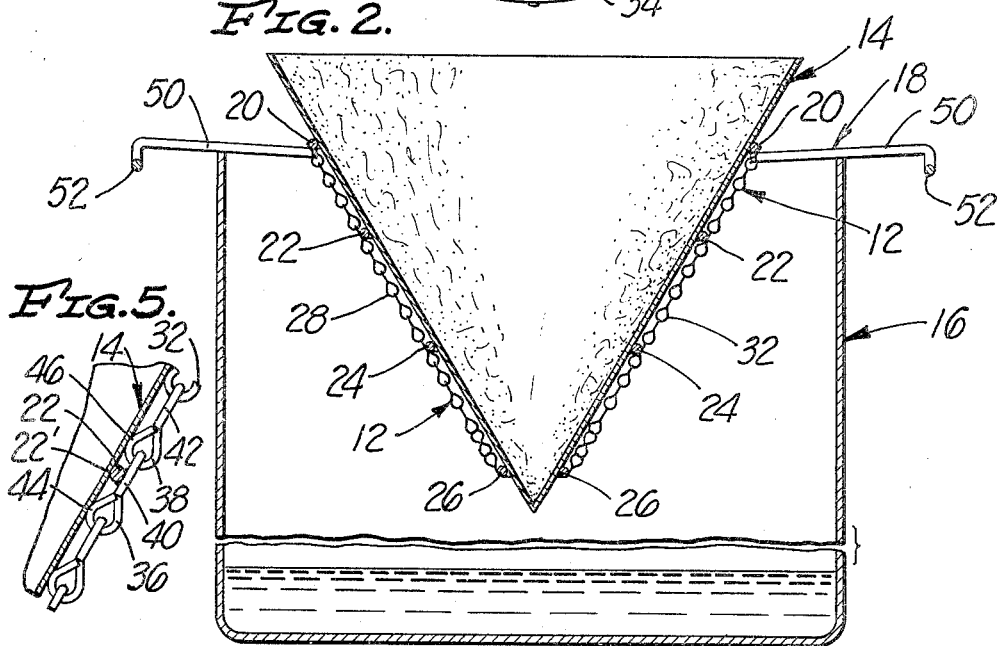
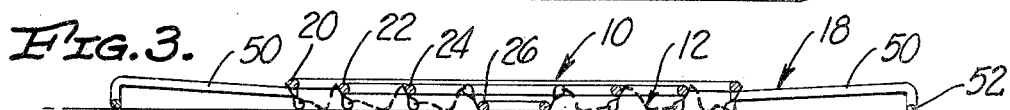
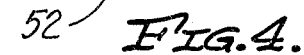
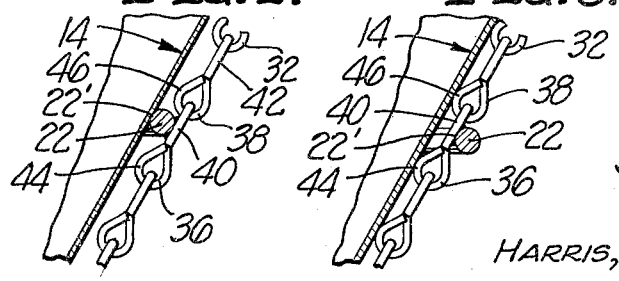
INVENTOR
SALVATORE C. MINEO
BY HIS ATTORNEYS
HARRIS, KIECH, RUSSELL & KERN United States Patent Office 3,497,071
Patented Feb. 24, 1970

ABSTRACT OF THE DISCLOSURE

An improved holder for supporting a conical filter in an open-top filtrate-receiving container. At least two rings are sized and shaped to correspond to the outside of the conical filter at different elevations, the rings being connected by collapsible attaching means such as chains. The rings and chains are collapsible into the plane of the first ring for shipping, storage, or cleaning. Support means are attached to the largest ring and extend over an upper lip of the filtrate-receiving containing.

---

The subject invention relates generally to filtration apparatus and filter holders and more particularly to an improved holder for conical filters.

Holders adapted for conical filters have heretofore been bulky and oddly shaped. This has created problems for the manufacturer, the shipper, the distributor, and the user. Some of the problems include wasted storage space, the necessity of having a high-cost, custom-designed shipping and storage box, the strong possibility of denting or otherwise damaging the holder, the difficulty of cleaning by immersing or by any other method, etc. Most commonly the filter holder is a funnel that must be supported above or within the vessel that is to receive the filtrates. These and other prior filter holders tend to impede the passage of the filtrate because the liquid adheres to the walls of the holder and because of insufficient space between the outside surface of the filter and the walls of the holder. While some attempts have been made to facilitate the flow of the filtrate, as by perforating the walls of the filter holder, these only partially solve the flowing problem.

A general object of the present invention is to solve the above enumerated problems of the prior art as well as develop an inexpensive and simple filtration apparatus and filter holder. A related object is to provide a filter holder that is collapsible into a compact size and shape.

More particularly, a primary object of the present invention is to provide a holder for a filter which has at least two generally concentric rings of different diameters for supporting a conical filter. A related object is to provide collapsible means for attaching the rings together. Another related object is to provide a holder for a filter which has at least two generally concentric rings of different diameters attached together by collapsible means, the rings and the collapsible attaching means being collapsible into the plane of the ring with the largest diameter.

Another object is to provide a holder for a filter which has a plurality of rings of different diameters which are collapsibly connected by a plurality of small chains. A related object is to have the chains disposed either to give support to the outside filter surface or to be spaced therefrom so that the filter rests exclusively on the rings or partly on the rings and partly on the chains.

A further object is to provide a holder for a filter having means for locally draining the exuding filtrate away from the outer surface of the filter without impeding the passage of the filtrate through the filter. A related object is to provide small chains having crests in contact with the outer surface of the filter in supporting relation thereto to facilitate drainage of the exuding filtrate to a filtrate-receiving container.

Still another object is to provide a holder for a filter which has support means attached to and extending outward from the largest supporting ring for engaging the upper lip of a filtrate-receiving container.

Further objects and advantages of the invention will be evident to those skilled in the art from the following description of the preferred embodiment.

In the drawing:

FIG. 1 is a top plan view of a filter holder;

FIG. 2 is a side sectional view of a filter holder taken along line 2—2 in FIG. 1, showing the holder supporting a conical filter in a filtrate-receiving container;

FIG. 3 is a side elevational view of a filter holder in a collapsed position;

FIG. 4 is a fragmentary sectional close-up of a portion of FIG. 2 showing the supporting relationship of a chain, a ring, and a conical filter;

FIG. 5 is a fragmentary sectional close-up showing a second embodiment of the supporting relationship of a chain, a ring, and a conical filter; and FIG. 6 is a fragmentary sectional close-up showing a third embodiment of the supporting relationship of a chain, a ring, and a conical filter.

In the drawing, the filter holder generally includes at least two rings 10 attached together by collapsible means comprising flexible connecting elements 12. The rings 10 and connecting elements 12 are disposed to be in general supporting relationship to a conical filter 14 having a closed depending apex, an inside surface bounding a space for a liquid to be filtered and an outside surface from which a filtrate exudes. The conical filter 14 is suspended by the holder over or within a filtrate-receiving container 16 having an open top. Support means 18 which are attached to a first large ring 20 extend outwardly to engage an upper portion of the filtrate-receiving container 16.

The liquid to be filtered is poured into the conical filter 14, the residual matter remaining on the inside surface of the filter and the liquid filtrate passing through the filter to the outside surface and dripping or running into the bottom of the filtrate-receiving container 16. The number and size of the rings 10, the size and type of connecting elements 12, the particular way the rings 10 and connecting elements 12 are attached to each other, and the type of supporting relationship the rings 10 and connecting elements 12 have with the conical filter 14 are all determined by the size of the filter 14 and the quality of the material being filtered. The holder can be used in combination with a circular sheet of filter paper folded or deformed into conical shape, a solid-formed conical filter, or other types of conical filters.

When not in use, the filter holder is collapsed into a small compact shape by collapsing the connecting elements 12 and the rings 10 into the plane of the first large ring 20 (see FIG. 3).

In the preferred form of the invention, the first large ring 20 has a diameter smaller than the distance across the top of the filtrate-receiving container 16. It and its inner surface are preferably sized and shaped to correspond to the outside surface of the conical filter 14 at a first elevation near its top. Other intermediate rings 22, 24 of diameters progressively smaller than the diameter of the first large ring 20 have their inner surfaces sized and shaped to correspond to the outside filter surface at second and third elevations, respectively. A lower ring 26 has a diameter smaller than the diameters of the first large ring 20 and the intermediate rings 22, 24. It and its inner surface are sized and shaped to correspond to the outside filter surface at a fourth elevation a significant distance from the depending apex of the conical filter 14.

In the illustrated form, the flexible connecting elements 12 are shown as four chains, designated individually as 28, 30, 32, 34, having ends attached to the first large ring 20 and the lower ring 26, respectively, and having intermediate links attached to the intermediate rings 22, 24, respectively. Attachment is accomplished by welding, soldering, or otherwise suitably attaching the apropriate link to the outer surface of each of the rings 10. When such rings 10 are in a suspended position (see FIG. 2), their inner surfaces generally define the configuration of a conical figure.

In the preferred embodiment, when the conical filter 14 is placed within the holder while the rings 10 are in a suspended position, the inner surfaces of the rings 10 engage the outside surface of the conical filter 14 in supporting relationship. The chains 28, 30, 32, 34 are spaced at 90° intervals around the outer surfaces of the rings 10 and hold the rings 10 in proper spaced relationship during the filtering process without contacting the outside surface of the conical filter 14.

FIG. 4 shows, by way of example, the manner of attaching the links to the rings 10 in the above-described embodiment. Here, a typical link of the chain such as chain 32 includes alternate loop portions 36, 38 lying in planes different from the intervening loop portions 40, 42. One or both sides of an appropriate loop such as the designated intervening loop 40 may be welded or otherwise attached to the outer surface of a ring such as the ring 22, the alternate loops 36, 38 of the chain 32 being of such size relative to the cross-sectional diameter of the ring 22 as to space such alternate loops from the outside surface of the filter 14. In this way the intermediate portions of the chain 32 may be spaced from the outside filter surface in at least the zones near the points of attachment of the chain 32 to the ring 22. Filtrate exuding from the filter may run along the exterior thereof to the next lower ring and drop therefrom or channel along the chains to the lowest ring, all while avoiding the impedance to flow through the filter that would result if the filter were placed in a funnel with no perforations in its walls.

However, it is within the scope of the invention, to use chains of such alternate loop size relative to the cross-sectional diameter of the rings as to dispose the crests 44, 46 of the alternate loops 36, 38 to be contacted by the outside surface of the filter 14. In such a second embodiment (see FIG. 5), the inner surface of the ring 22 and the crests 44, 46 of the alternate loops 36, 38 directly contact the outside filter surface. Filtrate exuding from the filter may localize on and drop from the lowest portions of the contacting loops to the bottom of the container or run from the contacting loops to adjacent lower loops and drop therefrom or be channeled along the chain to the lowest ring or to the apex of the filter. The last mentioned channeling function is performed by the chains even if the intermediate portions thereof or the loops thereof are spaced from the outer surface as in the first embodiment. In this event filtrate exuding at a position above each ring can flow along the outside surface to the next lower ring to channel downward along lower chain sections to the lowest ring or to the filter apex.

Alternatively, and as shown in FIG. 6, the filter holder may be designed so that the inner surface of the ring, e.g. the surface indicated at 22', does not directly engage the outside filter surface. By way of example, a typical link of the chain again includes alternate loop portions 36, 38 lying in planes different from the intervening loop portions 40, 42. In the instant embodiment, one or both sides of an appropriate loop such as intervening loop 40 may be welded or otherwise attached to the inner surface 22' of the ring 22. In this way the crests 44, 46 of the alternate loops 36, 38 will directly contact the outside filter surface while the inner surface 22' of the ring 22 will be spaced from the outside filter surface. The alternate loops 36, 38 contact the outside filter surface in direct supporting relationship while at the same time providing possible paths for draining the exuding filtrate away from the outside filter surface. The flow pattern of the exuding filtrate is similar to the flow pattern described hereinbefore for the second embodiment.

It is within the spirit of the invention to vary the number of crests contacting the outer filter surface, change the diameter of the loops, adopt different loop shapes, use different materials to make the links, or to change the type and number of chains in order to control the speed and uniformity of the filtering and the distribution and collection of the exuding filtrate.

In the illustrated form, the support means 18 comprise two similarly constructed U-shaped elements 48 oppositely attached to the first large ring 20 and preferably formed of heavy wire or rod material bent to the shape shown. Each of the elements has a pair of arms 50 extending horizontally and outwardly to a position beyond the upper lip of the filtrate-receiving container at which point they connect to a transverse base 52. The arms 50 are suitably attached, as by welding, to the lower surface of the first large ring 20 so that the arm ends do not extend inside the inner surface of the first large ring 20, thereby avoiding contact with the outside filter surface. Lip-engaging means, shown here as the bottom edges of the arms, engage the upper lip to support the first large ring 20 adjacent the open top of the container 16. The arms have downward bent portions interconnected by the transverse base and forming bights depending to positions below the upper lip of the container. The possibility of inadvertently sliding the holder off the upper lip of the container 16 is therefore minimized. The holder in its illustrated form can be used in combination with any container having an upper lip of lesser diameter than the distance between the transverse base members.

Various changes and modifications can be made without departing from the spirit of the invention as defined in the appended claims.

I claim:
1. An improved holder for supporting a conical filter in a filtrate-receiving container with an open top and a bottom, said improved holder including in combination:
  a first large ring smaller than the distance across said open top and sized to engage the outside of said conical filter at a first position near its top;
  means for supporting said first ring over said bottom of said container in the vicinity of its open top;
  a lower ring of smaller diameter than said first ring sized and shaped to correspond to the outside of said conical filter at a second elevation between its apex and said first position; and
  collapsible means attaching said first ring to said lower ring and extending therebetween, said rings and said collapsible attaching means being collapsible into the plane of said first ring with said lower ring and said collapsible attaching means within the confines of said first ring.

2. An improved filter holder as defined in claim 1 adapted for use with a filtrate-receiving container having an upper lip in which said support means is attached to and extends outward from said first ring to a position beyond said upper lip of said container, said support means having engaging means engageable with said upper lip for supporting said first ring adjacent the open top of said container.

3. An improved filter holder as defined in claim 2 in which said collapsible means includes flexible connecting elements having ends respectively attached to said rings.

4. Filtration apparatus including in combination:
an open-top filtrate-receiving container having an upper lip;
a conical filter having a closed depending apex, an inside surface bounding a space for the liquid to be filtered, and an outside surface from which the filtrate exudes;
a first large ring smaller than the distance across said upper lip and corresponding in size and shape to said outside filter surface at a first elevation near the top thereof and substantially removed from the depending apex;
support means attached to and extending outward from said large ring to a position beyond said upper lip of said container, said support means having lip-engaging means resting on said lip supporting said large ring adjacent the open top of said container;
a lower ring smaller than said first ring corresponding in size and shape to said outside surface of said filter at another elevation between said first elevation and said depending apex; and
collapsible means attaching said lower ring to said first ring, said rings and said collapsible means being collapsible into the plane of said first large ring with said lower smaller ring and said collapsible means within the confines of said first ring.

5. Filtration apparatus as defined in claim 4 in which said collapsible means includes flexible connecting elements having ends respectively attached to said rings.

6. Filtration apparatus as defined in claim 5 in which said flexible connecting elements have intermediate portions between the ring-attached ends thereof lying in a conical plane generally conforming to the conical plane of said filter when said lower ring is suspended below said first large ring by said connecting elements.

7. Filtration apparatus as defined in claim 6 in which said flexible connecting elements are secured to said rings at such positions that their intermediate portions lie substantially in the plane of said outer surface of said conical filter when said lower ring is in suspended position with at least a portion of the intermediate portion of each connecting element engaging said outside surface in supporting relation during filtering of said liquid through said filter.

8. Filtration apparatus as defined in claim 7 in which said connecting elements are link chains with alternate loop portions lying in planes different from the intervening loop portions, the alternate loop portions having crests engaging said outer surface of said filter at spaced positions along the path of each chain.

9. Filtration apparatus as defined in claim 6 in which said rings provide inner surfaces sized to engage said outside filter surface and in which said connecting elements are secured to outer surfaces of said rings to dispose the intermediate portions of said connecting elements outwardly of the plane of said outer surface of said conical filter in at least the end zones of each connecting element adjacent its point of attachment to the rings to minimize contact between said connecting elements and said outside filter surface.

10. Filtration apparatus as defined in claim 9 in which said connecting elements are chains with end links respectively secured to said rings and with intermediate links spaced from the outer surface of the conical filter to minimize contact between said connecting elements and said outside filter surface.

11. Filtration apparatus as defined in claim 5 in which said support means comprises two U-shaped elements with outer portions bent downward to form bights at a position outside said upper lip of said container.

12. Filtration apparatus including in combination:
an open-top filtrate-receiving having an upper lip;
a conical filter having a closed depending apex, an inside surface bounding a space for the liquid to be filtered, and an outside surface from which the filtrate exudes;
three rings of progressively smaller diameters including first, intermediate, and lower rings corresponding in size and shape to said outside filter surface at different elevations thereof with the lower ring corresponding in size and shape to said outside filter surface at an elevation near the bottom of the filter a significant distance above the apex thereof;
support means attached to and extending outward from the first and largest ring to a position beyond said upper lip of said container, said support means having lip-engaging means resting on said lip supporting said largest ring adjacent the open top of said container; and
a plurailty of flexible connecting elements attaching said rings together, said connecting elements comprising chains lying in a conical plane generally conforming to the conical plane of said outside filter surface when said intermediate and lower rings are suspended below said first and largest ring by said chains, said rings and said chains being collapsible into the plane of said first and largest ring with said intermediate and lower rings and said chains within the confines of said largest ring.

13. Filtration apparatus as defined in claim 12 in which said chains are secured to said three rings at such positions that said chains lie substantially in the plane of said outer surface of said conical filter when said intermediate ring and said lower ring are in suspended position with at least portons of said chains engaging said outside filter surface in supporting relation during filtering of said liquid through said filter.

14. Filtration apparatus as defined in claim 12 in which said rings provide inner surfaces sized to engage said outside filter surface at said corresponding elevations, and in which said chains are secured to the outer surfaces of said rings to dispose said chains outwardly of the plane of said outside filter surface in at least the zones adjacent each chain's points of attachment to said rings to minimize contact between said chains and said outer surface.

References Cited

UNITED STATES PATENTS

| | | | |
|---|---|---|---|
| 96,765 | 11/1869 | Andrews | 210—455 |
| 832,936 | 10/1906 | Vaughan | 210—541 X |
| 1,016,249 | 2/1912 | Comtois | 210—474 X |
| 1,111,249 | 9/1914 | Courtwright | 210—474 |
| 2,382,222 | 8/1945 | Havas | 210—474 X |
| 2,533,815 | 12/1950 | Kelly | 210—455 X |

REUBEN FRIEDMAN, Primary Examiner

C. M. DITLOW, Assistant Examiner

U.S. Cl. X.R.

210—541

PO-1050
(5/69)

UNITED STATES PATENT OFFICE
CERTIFICATE OF CORRECTION

Patent No. 3,497,071    Dated  February 24, 1970

Inventor(s)  Salvatore C. Mineo

It is certified that error appears in the above-identified patent and that said Letters Patent are hereby corrected as shown below:

Column 1, line 22, "containing" should be --container--.

Column 6, line 6, insert --container--before "having".

SIGNED AND
SEALED
JUL 14 1970

(SEAL)
Attest:

Edward M. Fletcher, Jr.
Attesting Officer

WILLIAM E. SCHUYLER, JR.
Commissioner of Patents